United States Patent [19]

Igeta

[11] 4,070,040
[45] Jan. 24, 1978

[54] SEAT BELT SYSTEM

[76] Inventor: Harutoshi Igeta, No. 17-24, 3-chome, Kirennishi, Hirano, Osaka, Japan

[21] Appl. No.: 639,611

[22] Filed: Dec. 10, 1975

[30] Foreign Application Priority Data

Sept. 17, 1975 Japan .............................. 50-127980

[51] Int. Cl.² ........................................... B60R 21/00
[52] U.S. Cl. .................................................. 280/745
[58] Field of Search ................ 280/745; 297/388, 389

[56] References Cited

U.S. PATENT DOCUMENTS

| 3,830,518 | 8/1974 | Silber | 280/745 |
| 3,926,455 | 12/1975 | Lindblad | 280/745 |

Primary Examiner—Robert R. Song
Attorney, Agent, or Firm—Wenderoth, Lind & Ponack

[57] ABSTRACT

A seat belt system for motor vehicles including a rail extending along the vehicle roof in a ~-shaped path and then down the center pillar. Two belts are carried by their respective carriages which travel in the rail. One belt is engageable halfway of the rail to serve as a shoulder belt whereas the other belt is lockable at the bottom of the rail to serve as a waist belt.

4 Claims, 6 Drawing Figures

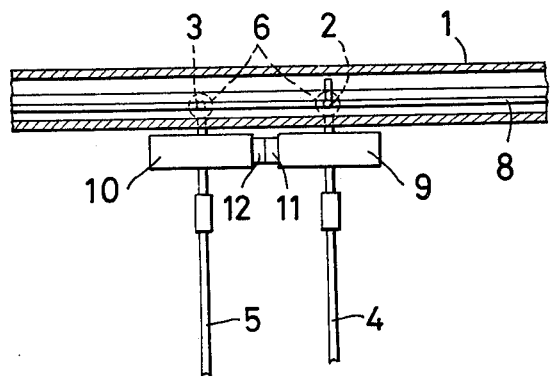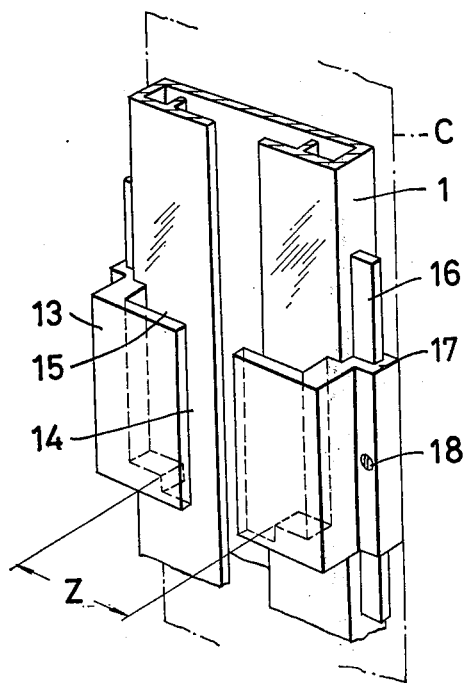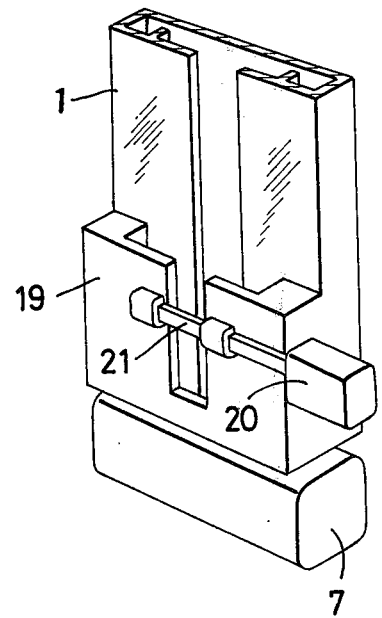

SEAT BELT SYSTEM

The present invention relates to a seat belt system for motor vehicles, more particularly to actuating means for putting the 3-point safety seat belts into and out of their operative position.

For the 3-point seat belt arrangement in which one belt extends across the waist of the occupant of the seat while the other belt is stretched diagonally from his shoulder to waist, there are two types of actuators, one cooperating with the opening or closing of a door and the other including a rail mounted on the roof for carrying the seat belts stretched between the bottom of seat and the car roof.

This invention is of under the latter type. The seat belts are moved into their operative position by their respective carriages which travel in a rail provided to extend across the car roof over the seat and down the center pillar.

In any of the prior art seat belt systems of this type (for example, the one disclosed by U.S. Pat. No. 3,850,518) had a rail mounted on the car roof to extend in a large ∩ -shaped arch over the seat occupant. But, such an arrangement had shortcomings of longer time taken for belt travel because of a roundabout track, some difficulty in guiding the belt carriages smoothly on such a curving track, bulky rail and carriage complicated in construction, high manufacturing cost, awkward appearance, and a feeling of pressure given to the seat occupant.

It is an object of the present invention to obviate such shortcomings of the prior art system.

Other objects and advantages of this invention will become apparent from the following description with reference to the accompanying drawings in which;

FIG. 4 is a side view showing the carriages travelling side by side in the rail;

FIG. 5 is a perspective view of the locking means for the shoulder belt; and

FIG. 6 is a perspective view of the locking means for the waist belt.

Figure 1:
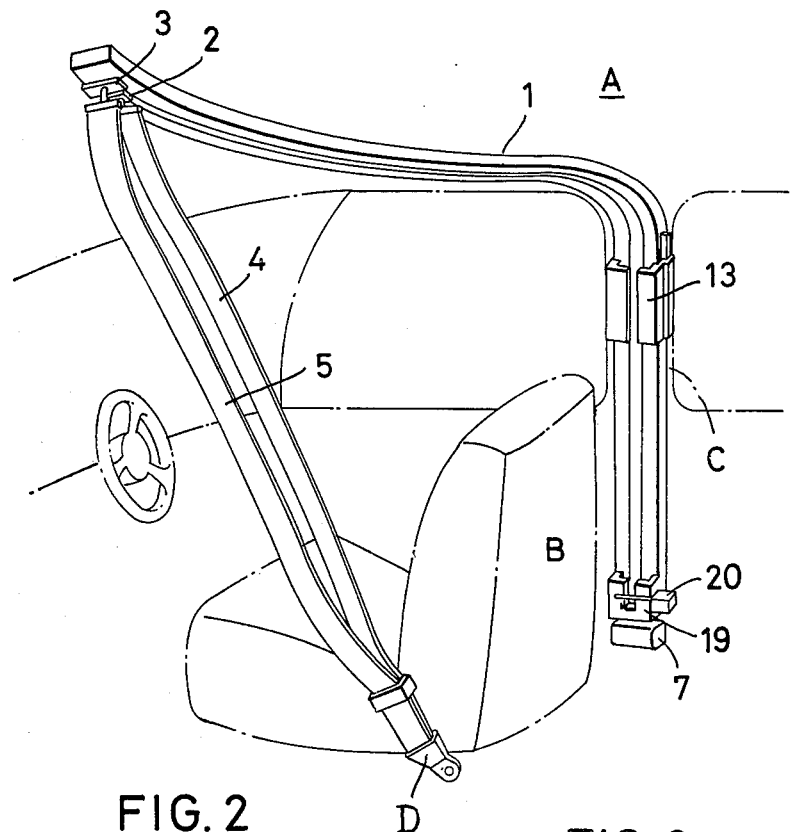
FIG. 1 is a perspective view of a seat belt system according to the present invention.

Unlike the conventional system having a ∩ -shaped rail, the seat belt system according to this invention has a rail extending in a ⌐-shaped path. In FIG. 1, the rail 1 has its upper end disposed just over the lefthand front portion of the seat B in the car A. It is mounted on the roof to extend toward the center pillar C on the outer side of the seat in a gentle curve along the roof surface. When it reaches over the center pillar, it turns its course downward to extend along the center pillar of the bottom thereof.

Two carriages 2 and 3 are mounted in the rail and travel therealong. Two belts 4 and 5 extend upwardly from a belt winder D disposed at the lefthand rear portion of the seat and are connected at their upper ends to the carriages 2 and 3, respectively. One carriage 2 is adapted to be locked at the bottom of the center pillar C and the other carriage 3 is adapted to be locked adjacent to the upper end thereof.

Figure 2:
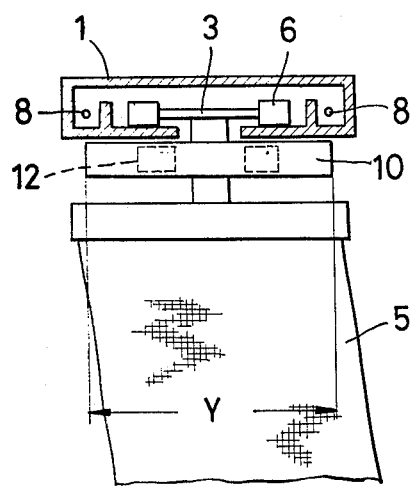
FIG. 2 is a front view of the carriage for the shoulder belt.
Figure 3:
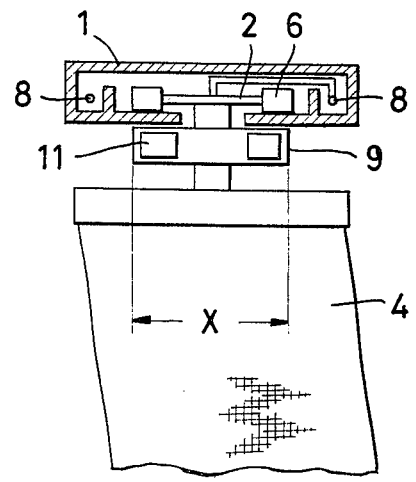
FIG. 3 is a front view of the carriage for the waist belt.

Each carriage is provided with a pair of wheels 6 at its opposite ends which are engaged in the rail 1 of a ⊐-shaped cross-section to roll therein. The carriage 2 is reversably driven by a drive wire 8 which is connected to a motor 7 provided at the bottom of the center pillar C to run in the rail 1 therealong. The other carriage 3 is not coupled to the drive wire. (FIGS. 2 and 3)

The carriages 2 and 3 are provided below their main portions with flanges 9 and 10, respectively, on the opposite surfaces of which plate magnets 11 and 12 are pasted, respectively, to keep the flanges 9 and 10 together. This ensures that the carriages 2 and 3 travel side by side in the rail 1.

The flange 10 for the carriage 3 is made to be wider than the flange 9 for the carriage 2. At the upper portion of the center pillar C is a locking means 13 for the shoulder belt shown in FIG. 5. The locking means 13 has a passage 14 which allows the flange 9 for the carriage 2 to pass therethrough but not the flange 10 for the carriage 3. In other words, the width Z of the passage 14 is larger than the width X of the flange 9 but smaller than the width Y of the flange 10. The locking means 13 has also a recess 15 formed therein to receive the flange 10 for the carriage 3.

The locking means 13 for the shoulder belt is secured to the rail 1 or the center pillar at a position adjustable according to the height of the shoulder of the seat occupant. The locking means 13 is provided with a ridge 17 at each end which is fitted on a projection 16 provided on each side of the rail 1 and is secured thereto by a screw 18. The position of the locking means 13 is adjustable along the projection 16.

At the bottom of the rail 1 is provided another locking means 19 for the waist belt (FIG. 6) which has a recess to receive the flange 9 for the carriage 2. This means is provided with a solenoid 20 which has a locking bar 21 to lock the flange 9 after it has entered the recess. The bar 21 is normally biassed by a spring into its locking position.

In operation, when a switch disposed at a convenient place in the car is turned on to start the motor 7, the drive wire 8 runs in the rail 1 to drive the carriage 2 from the inoperative position shown in FIG. 1 toward the center pillar. By the action of the plate magnets 11 and 12, the carriages 2 and 3 travel side by side, attracted to each other.

When they reach the locking means 13 for the shoulder belt, the flange 9 for the carriage 2 easily passes through the passage 14 whereas the flange 10 for the carriage 3 is blocked and held captive in the recess 15 with the plate magnet 12 acting on the metallic bottom of the recess 15. The belt 5 carried by the carriage 3 now serves as a shoulder belt. On the other hand, when the carriage 2 reaches the lower end of the rail 1, its flange 9 enters the recess in the locking means 19 for the waist belt. After being withdrawn from the passage by energization of the solenoid 20, the locking bar 21 protrudes again thereinto under the bias of the spring to lock the carriage 2, holding the belt 4 in its operative position as a waist belt. The belt 50 is now stretched diagonally from the shoulder to the waist of the seat occupant while the belt 4 extends across his waist.

In order to release the occupant from the seat belts, a release switch (not shown) suitably disposed in the car is turned on to cause the motor 7 and thus the wire 8 to rotate in a reverse direction. Simultaneously, the solenoid 20 is energized to withdraw the locking bar 21 from the passage so that the carriage 2 can leave the locking mean 19.

During its upward travel, the flange 9 pushes up the flange 10 so that the carriage 3 leaves the locking means 13 and travels along with the carriage 2 because the plate magnets 11 and 12 attract each other. In such a manner, the carriages 2 and 3 go back to the inner end of their path shown in FIG. 1

Although the preferred embodiment employs both the shoulder and waist belts, the waist belt may be omitted. In such a case, the motor 7 is mounted below the locking means 13 for the shoulder belt.

Plate magnets used in the embodiment may also be replaced by any other suitable mechanical means such as a hook to keep the two flanges together during their travel.

It will be understood from the foregoing description that the seat belt system according to the present invention the advantages of a considerably shorter belt path (about one-third of that in the conventional arrangement), smoother travel of the carriages because of a less curving course, reduction (to about one half) in time required for moving the seat belts into and out of position, compact and simple design for the rail and carriages, lower manufacturing cost, and less awkward appearance. No particular shortcomings are noted in that the seat belts take such a shortened course.

While this has been shown and described with reference to a preferred embodiment, it will be understood by those skilled in the art that other changes in form and details can be made therein without departing from the spirit and scope of the invention.

What is claimed is:

1. A seat belt system for an occupant seated on a seat in a motor vehicle, said system comprising:

first seat belt means fastened at one end to the lower side of said seat for crossing over the lap of said occupant on said seat;

second seat belt means fastened at one end to the lower side of said seat for crossing over the torso of said occupant on said seat;

a continuous rail positioned above said seat and extending straight downward along the inside wall of said motor vehicle beside said seat on the side of said seat opposite the side where said first and second seat belt means are fastened, said rail being slightly curved in shape above said seat, and having at least one continuous groove therein;

first carriage means movably contained in said groove in said rail and connected to said first seat belt means for moving said first seat belt means along and down said rail and across the lap of said occupant on said seat;

second carriage means movably contained within said groove in said rail and connected to said second seat belt means for moving said second seat belt means along and down said rail and across the torso of the said occupant on said seat;

a first flange connected to said first carriage means outside of said groove;

a second flange connected to said second carriage means outside of said groove, said second flange being wider than said first flange;

first locking means positioned along the portion of said rail extending downward along the sidewall of said motor vehicle for receiving and retaining therein said second flange, said first locking means being sufficiently large enough to allow said first flange to pass therethrough, while retaining said larger second flange therein;

second locking means positioned at the bottom of said rail extending downward along the sidewall of said motor vehicle for receiving and locking therein said first flange, said second locking means having a spring-biased and solenoid controlled locking bar for locking said first flange, and thus said first seat belt means, therein;

reversible motor means connected to said first carriage means for moving said first carriage means back and forth along said groove in said rail; and fastening means attached to said first and second flanges for releasably fastening said flanges together, whereby moving said first carriage means by said motor means also moves said second carriage means.

2. A system as claimed in claim 1, wherein said fastening means is comprised of:

first and second magnets attached to said first and second flanges respectively in contact with each other when said first and second flanges are side by side along said rail, whereby said first and second flanges are magnetically held together.

3. A system as claimed in claim 1, wherein said fastening means is comprised of a hook holding said first and second flanges together.

4. A system as claimed in claim 1, wherein said first locking means is adjustable along said portion of said rail extending downward.

* * * * *